(12) United States Patent
Gadek et al.

(10) Patent No.: US 11,269,928 B2
(45) Date of Patent: Mar. 8, 2022

(54) IDENTIFICATION AND ANALYSIS OF COHESIVE AND TOPIC-FOCUSED GROUPS OF USER ACCOUNTS FROM USER-GENERATED CONTENT ON ELECTRONIC COMMUNICATION PLATFORMS

(71) Applicant: AIRBUS DEFENCE AND SPACE SAS, Toulouse (FR)

(72) Inventors: Guillaume Gadek, Montigny-le-Bretonneux (FR); Khaled Khelif, Villiers Saint Frédéric (FR); Nicolas Malandain, Pont de l'arche (FR); Alexandre Pauchet, Saint-Étienne-du-Rouvray (FR); Laurent Vercouter, Elbeuf (FR)

(73) Assignee: AIRBUS DEFENCE AND SPACE SAS, Toulouse (FR)

( * ) Notice: Subject to any disclaimer, the term of this patent is extended or adjusted under 35 U.S.C. 154(b) by 0 days.

(21) Appl. No.: 16/759,546

(22) PCT Filed: Oct. 25, 2018

(86) PCT No.: PCT/EP2018/079264
§ 371 (c)(1),
(2) Date: Apr. 27, 2020

(87) PCT Pub. No.: WO2019/081631
PCT Pub. Date: May 2, 2019

(65) Prior Publication Data
US 2021/0182317 A1   Jun. 17, 2021

(30) Foreign Application Priority Data

Oct. 26, 2017 (EP) .................................... 17306478
Mar. 20, 2018 (EP) .................................... 18162911

(51) Int. Cl.
*G06F 16/28* (2019.01)
*G06F 16/25* (2019.01)
*G06F 16/901* (2019.01)

(52) U.S. Cl.
CPC .......... *G06F 16/285* (2019.01); *G06F 16/254* (2019.01); *G06F 16/9024* (2019.01)

(58) Field of Classification Search
CPC .. G06F 16/285; G06F 16/254; G06F 16/9024; G06F 16/335; G06F 40/10;
(Continued)

(56) References Cited

U.S. PATENT DOCUMENTS

| 8,694,593 B1* | 4/2014 | Wren .................. H04L 51/32 709/206 |
| 9,509,643 B1 | 11/2016 | Gade et al. |
| 2010/0177938 A1* | 7/2010 | Martinez ............ G06K 9/00677 382/118 |

OTHER PUBLICATIONS

Recalde et al.: "Detection of Trending Topic Communities: Bridging Content Creators and Distributors", arxiv.org, Cornell University Library, 201 Olin Library Cornell University Ithaca, NY 14853, Jul. 27, 2017 (Jul. 27, 2017), XP080779911, (Year: 2017).*
International Search Report as issued in International Patent Application No. PCT/EP2018/079264, dated Nov. 26, 2018.
(Continued)

*Primary Examiner* — Evan Aspinwall
(74) *Attorney, Agent, or Firm* — Pillsbury Winthrop Shaw Pittman LLP

(57) ABSTRACT

A computer implemented method for detecting a set of relevant communities of accounts, the accounts being connected by at least one communication platform, includes collecting data from a stream of messages circulating on at least one communication platform; extracting interaction data and shared objects, the shared objects being shared among the accounts; processing each collected message in order to obtain content metadata; processing collected data in order to obtain an account profile of each account; from
(Continued)

collected data building shared objects graphs and interaction graphs; building a resulting graph; applying a community detection method to the resulting graph to obtain a set of communities of accounts; computing quality indicators of the set of communities to obtain at least one score for each community the score enabling the selection of at least a relevant community.

13 Claims, 8 Drawing Sheets

(58) Field of Classification Search
CPC ........ G06F 40/284; G06F 40/30; G06F 40/35; H04L 51/16; H04L 51/20; H04L 51/32; G06Q 30/0201; G06Q 50/01
USPC ........................................................ 707/602
See application file for complete search history.

(56) References Cited

OTHER PUBLICATIONS

Recalde, L., et al., "Detection of Trending Topic Communities: Bridging Content Creators and Distributors," Cornell University Library, Jul. 2017, XP080779911, 9 pages.
Gadek, G., et al., "Measures for topical cohesion of user communities on Twitter," Proceedings of the International Conference on Web Intelligence, Aug. 2017, XP055455499, pp. 211-218.
Gadek, G., et al., "Topical cohesion of communities on Twitter,"Procedia Computer Science, vol. 112, Sep. 2017, XP055455501, pp. 584-593.

* cited by examiner

IDENTIFICATION AND ANALYSIS OF COHESIVE AND TOPIC-FOCUSED GROUPS OF USER ACCOUNTS FROM USER-GENERATED CONTENT ON ELECTRONIC COMMUNICATION PLATFORMS

CROSS-REFERENCE TO RELATED APPLICATIONS

This is the U.S. National Stage of PCT/EP2018/079264, filed Oct. 25, 2018, which in turn claims priority to European Application No. 17306478.3, filed Oct. 26, 2017 and European Application No. 18162911.4, filed Mar. 20, 2018, the entire contents of all applications are incorporated herein by reference in their entireties.

TECHNICAL FIELD

The invention belongs to the field of the computer implemented methods and systems for analyzing big volumes of heterogeneous data. An example of such data consists of the data used as input in the Open Source Intelligence domain. A first object of the invention is a computer implemented method for detecting a set of relevant communities formed by accounts communicating through at least one communication platform. A second object of the invention is a system for implementing the method for detecting a set of relevant communities.

PRIOR ART

The number of communication services has increased in the last years. Among the available services, Internet users have notably the possibility to share multimedia messages through platforms such as e-mail providers, blogs, websites, social networks and other communication platforms. A communication platform shall be understood as an online communication system enabling users to create and manage user accounts and to produce, publish, and/or exchange messages and contents, thus generating a network of connected users. Phone users can either access Internet-based services, or send calls, texts or multimedia messages. These multimedia messages comprise simple text as well as Internet webpage links, images, videos or other items shared between user accounts.

As an example, online communication platforms have emerged in the media communications: with more than 300 million active users or accounts and 500 million new messages emitted each day, Twitter is a symbol of Web2.0. Other examples include Reddit, Facebook, SinaWeibo or VKontakte. This huge amount of data is the input of the OSINT (Open Source Intelligence) domain. At the same time, it increases the difficulty to extract the relevant information for analysts. Big data analysis is required to produce relevant information, notably in defence and marketing domains.

Data analysis, notably on Open Source information, is rendered complex because of the huge amount of data. The data is mostly unstructured (the most interesting parts are contained in a free textual field). Each of the communication platforms provides a flow of user-generated messages. Analysts want to obtain information on the coordination and interaction between accounts on such platforms.

Each of the communication platforms can be seen as a "graph of communication". Such a graph is for example a data model where users or accounts are represented by nodes, and are linked according to the real interaction, communication similarity and communications between the accounts.

To obtain information from one or several communication platforms or networks, an analyst has to analyse one or several graphs, which requires human intervention. Amongst the various tasks in Open Source Intelligence, there is the task of community detection, which consists in the identification of a group of accounts on a communication platform.

Existing community detection services rely on criteria such as:
All the users who mentioned a specific keyword;
A group of connected users by links proposed by the communication platform.

These existing methods are limited, require human intervention and do not enable efficient collection of high volumes of heterogeneous data and efficient processing of complex interactions and shared objects. They do not provide an in-depth analysis of the results and only provide lists of accounts, the accounts being members of the communities.

GENERAL SUMMARY OF THE INVENTION

The method according to the present invention at least partially solves the above-mentioned technical problems by collecting in real time messages exchanged by accounts on one or more communication platforms. This huge amount of heterogeneous data is automatically processed in order to extract information such as account data, interaction data and shared objects data. The extracted data are used to create account profiles and to represent the communication platform as graphs. In particular, shared objects and interaction graphs are combined in a resulting graph giving a comprehensive representation of the communication platforms activities. By processing the obtained graphs and the obtained user profiles, the computer implemented method according to the invention manages to detect relevant account communities and their structure, i.e. the role of their members. Thanks to automatic, fast and efficient graph processing, the invention provides an in-depth analysis of communication platform, with no or little human intervention. The method according to the invention is then faster and more accurate than standard methods, which heavily rely on human intervention.

To solve the mentioned technical problems, a first object of the present invention is a computer implemented method for detecting a set of relevant communities of accounts, said accounts being connected by at least one communication platform, said method comprising the following steps:
Collecting data from a stream of messages circulating on at least one communication platform, said collected data comprising message content and account information;
Extracting, from each collected message, interaction data, account data and shared objects, said shared objects being shared among the accounts through at least one communication platform;
Processing each collected message in order to obtain content metadata;
Processing shared objects, interaction data, account data and content metadata associated with a same account, said processed shared objects, interaction data, account data and content metadata being collected during a first collecting period and for each account, in order to obtain an account profile of each account;

From the shared objects, the account data and the interaction data building shared objects graph and interaction graphs, said shared objects, account data and interaction data for graph building being collected during a second collecting period;

Aggregating shared objects graphs and respectively interaction graphs, during a third collecting period, to obtain an aggregated shared objects graph and respectively an aggregated interaction graph;

Building a resulting graph, the resulting graph being the combination of the aggregated shared objects graph and of the aggregated interaction graph;

Applying a community detection method to the resulting graph to obtain a set of communities of accounts;

Computing quality indicators of the set of communities to obtain at least one score for each community according to at least one quality indicator method taking into account content metadata (CM) and/or account profiles, said score enabling the selection of at least a relevant community.

We mean by account one entity able to send and receive content through a communication platform. An account can be associated to a single user. Alternatively, an account can represent an institution, a corporation or any sort of group of users or people. An account can also represent a worker or a department of a company sharing information concerning his intervention on specific parts of a product. Such interventions could occur during conception, building or maintenance of the product, and feed an open platform, for instance a ticket manager system.

We mean by relevant community a subset of the accounts communicating through the communication platform. The accounts belonging to a detected relevant community can have some special feature, which makes it important to detect them and their connections. More generally, the criteria used to define a community answer a need formulated by an analyst. For example, a relevant community can be a group of users sharing an interest or having a behavior which is particularly influential on other accounts.

We mean by messages circulating on a communication platform, any piece of information able to be sent/received by an account. Such a message can contain information such as text, images or any other content supported by the communication platform.

We mean by collected data a two-fold piece of information containing both message content such as message text or media content, and account information such as account identifier or user name.

We mean by interaction data any piece of information about a relation between two or more accounts. For example, if an account relays a message from another account, a relation is established between the two accounts. A relation is also established if a message from an account explicitly cites another account, or is explicitly linked to a previous message.

We mean by account data any piece of information concerning the account itself.

We mean by shared objects any piece of information intended to be shared among accounts and through the communication platform. For example, shared objects can comprise URLs, hashtags, media content such as photos, videos or audio recordings, user mentions, technical or general shared files, reports.

We mean by content metadata the set of information extracted from the content of the messages. For example, content metadata extracted from message text can comprise topics, sentiments, emotions or style expressed in or by the message text.

By account profile of each account we mean the set of data concerning the account and extracted from shared objects, interaction data and content metadata. The first collecting period is a lapse of time during which the data concerning the account are collected.

By graph, we mean a data structure comprising nodes connected by edges. By shared object graph we mean a graph in which accounts are the nodes of the graph. An edge connecting two nodes represents the quantity of shared objects emitted by both accounts corresponding to the two connected nodes. By interaction graph, we mean a graph whose nodes are accounts. An edge connecting two nodes represents an interaction between the accounts corresponding to the two nodes. The second collecting period is the lapse of time during which the data for building the shared object graph and the interaction graph are collected.

By aggregated shared objects graph, respectively interaction graph, we mean a shared object graph, respectively an interaction graph, whose data are collected during a third collecting time.

By resulting graph, we mean a combination of the aggregated shared objects graph and the aggregated interaction graph. The combination is for example the sum or the intersection of the two aggregated graphs.

By community detection method, we mean a method which applied to the resulting graph returns a list of sets of nodes, each set representing a community. Each couple node/community is associated with a belonging coefficient representing the importance of the community for the given node. For example, a node may belong 50/50 to two communities.

By quality indicators of a community we mean a set of parameters used for describing the communities. Quality indicators are computed based on account data, interaction data and content metadata. These quality indicators can comprise topological indicators computed on the resulting graph or content-based indicators. Examples of topological indicators are the modularity of the community on the graph, the density or the size of the community.

Generally speaking, the computer implemented method according to the invention is a system which collects and stores messages coming from a communication platform. It extracts information from the messages to feed a structured database. From the collected information, the computer implemented method builds graphs to enable the representation and use of the links—interaction or shared objects—between communication platforms users.

The computer implemented method according to the invention performs treatments on the obtained graphs to produce two outputs: first, communities, which answer a need formulated by the intelligence analysts; second, user profiles, which can then be used to precisely describe the previously obtained communities.

Advantageously, the method according to the invention requires little or no human intervention, being automatically performed.

The present invention proposes to build and process graphs in order to select key accounts also named "key actors" and produce associated data, such as group information in order to point out one big user account—an "influential" account—or a network of small-but-coordinated accounts.

The computer implemented method according to the invention processes and stores multimedia data and computes account profile information associated with each account and relational data between accounts. Thanks to a specific treatment of the collected data and of the obtained graphs it is possible to cluster accounts in communities which can be evaluated in order to measure their impact.

Advantageously, the method according to the invention is scalable. It can process millions of messages each day, which is impractical with human analysts.

Advantageously, the computer implemented method according to the invention is domain-independent and it can be adapted to several practical applications. For example, it can be used in industry, defense, marketing or internal e-mail analysis applications.

Advantageously, the first, second and third collecting times are parameters that can be adapted to the temporal scale of the phenomena to which an analyst is interested. For example, if rapid evolutions are targeted, these can be observed thanks to the computer implemented method according to the invention by setting short values of the first, second and third collecting periods.

Besides the main characteristics, which have been outlined in the foregoing paragraphs, the computer implemented method for detecting a set of communities of accounts according to the invention may include one or more additional characteristics from those listed in the following, either individually or in any technical possible combination thereof:

The step of extracting, from each collected message, interaction data, account data and shared objects, further comprises setting a data structure containing shared objects extracted from the collected data;

the data structure comprises at least one of the following categories or any combination thereof:

Message identifier;

Date;

Accounts identifier;

Tags;

URLs;

Media contents;

Mentions or links to other accounts.

the data structure comprises text content and/or media content and/or user information;

the step of processing shared objects comprises a step of inserting in SO inventory content metadata;

the step of processing each collected messages comprises a media content processing step;

said calculated account profiles are stored in a database of account profiles;

the shared object graph and the aggregated shared object graph comprise a set of nodes connected by edges, the nodes being accounts and the edges connecting two nodes representing the quantity of shared objects emitted by both nodes, said shared object graph and aggregated shared object graph being stored in a dedicated database;

the interaction graph and the aggregated interaction graph comprise a set of nodes connected by edges, the nodes being accounts and the edges connecting two nodes being an interaction between the two nodes, said interaction graph and aggregated interaction graph being stored in a dedicated database;

the resulting graph is an intersection graph comprising the nodes and the edges present in both the aggregated shared object graph (Go1) and the aggregated interaction graph;

the method according to the invention further comprises a step of role detection performed on the aggregated interaction graph or the resulting graph within the determined communities;

Another object of the present invention is a system to automatically implement the computer implemented method according to the invention said system comprising:

At least a collecting unit to collect data from a stream of messages circulating on at least one communication platform;

A first memory unit to store the collected data;

At least one processing unit to process the collected data and to realize the step comprised in the computer implemented method according to the invention;

At least a second memory unit to store the output of the different steps of the method according to the invention;

A visualization unit to access the content of the first and second memory units.

Advantageously, the system according to the invention is able to automatically realize the computer implemented method for detecting a set of relevant communities of accounts. Moreover, an analyst can readily access the information concerning the set of relevant communities thanks to the visualization unit.

The system for implementing the method according to the invention can also comprise several collecting units, each unit being specific to a communication platform.

Advantageously, thanks to the different processing units the system according to the invention can collect heterogeneous data from several communication platforms.

The system for implementing the method according to the invention can also comprise several processing units. Each processing unit may be associated to a different piece of information extracted or processed from the collected messages.

LIST OF FIGURES

Other characteristics and advantages of the invention will be evident from the description thereof that is provided in the following, purely for non-limiting, exemplary purposes, with reference to the accompanying drawing, in which:

FIG. 1 represents the steps of the computer implemented method for detecting a set of relevant communities of accounts according to the invention;

FIG. 2 sketches the working principle of the computer implemented method of FIG. 1;

DETAILED DESCRIPTION OF THE INVENTION

Figure 1:
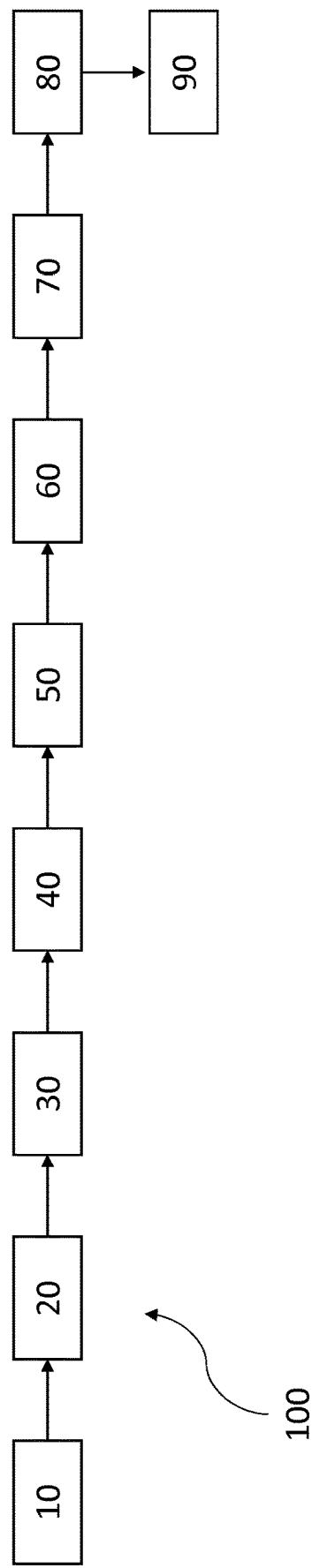

FIG. 1 shows the main steps of the computer implemented method 100 for detecting a set of relevant communities C of accounts $A_1, A_2 \ldots A_n$, said accounts $A_1, A_2 \ldots A_n$ being connected by at least one communication platform N. The explication of FIG. 1 partially refers also to FIG. 2 which shows the general working principle of the computer implemented method according to the invention.

The first step 10 of the method 100 is a step of collecting data D from a stream of messages circulating on at least one communication platform N. Data D collected are two-fold: messages such as text, media or metadata and account information such as account name, creation date or account personal data.

In particular, messages can contain the following information:
Identifier of the message/post;
Date (timestamp);
Content (text of the message);
Media attached (direct links towards image, video, URLs, photos, sounds, flow, other media types), whose nature depends on the communication platform;
Author of the post (account identifier, username, or URL, depending on the communication platform N);
Communication platform N endpoint of emission (for example web client, phone);
Other technical information (relating notably to the account) according to the targeted service.
Account information can comprise the following fields:
User identifier;
User name;
Date of creation of the account;
Description fields, provided either by the account, or automatically during account registration (textual fields such as location, biography, UTC offset, presence of a profile picture or any other information provided by the communication platform N);
User characteristics (such as: number of emitted messages, number of contacts with other accounts; the precise list depends on the communication platform or any other information provided by the communication platform N).

The step 10 of collecting data D is performed by an algorithm executed by a computer, also called a collector. The algorithm is specific to the communication platform N from which the data D are collected. The step of collecting data 10 is performed continuously.

Advantageously, thanks to the specificity of the data collection with regards to a given communication platform N, the computer implemented method 100 according to the invention is adapted to automatically collect high volumes of heterogeneous data D. The data D can be collected from several different communication platforms N.

The collected data D are then processed in a step 20 of extracting interaction data INT, shared objects SO and account data AD.

Interaction Data Extraction

Messages circulating on the at least one communication platform N can comprise interaction between accounts (as an example: a citation, a reply, a comment, a part of discussion between two user accounts) or not (as an example: a post on one's own page, a message without user mention). The first category is used here to keep track of account interactions: author, target of the interaction and metadata (type of interaction, date and time).

The automatic extraction of interaction data INT is performed by a dedicated algorithm also called an Interaction Extractor. Each Interaction Extractor is preferably dedicated to one or several determined communication platforms N. For example, it could be composed of citations, replies, mentions, comments, short preregistered actions such as likes, votes and follows. On a ticket manager, it would include updates on a ticket as an interaction towards the author of the ticket. On an e-mail system, it would include the interaction from the author to the destination.

Generally speaking, the interaction model explicitly refers to the features of the communication platform N, to facilitate the task of the Analyst.

Shared Object Extraction

This step consists in setting a data structure containing the shared objects SO of each message. Shared objects SO are conceptual pieces of content created with the intent to be shared amongst users. Shared objects SO include notably URLs, hashtags, media (such as photo/video/audio recordings), user mentions, files and reports. Each message may contain zero, one or more "shared objects".

The algorithm used to extract shared objects SO is also called a Shared Object Extractor.

A shared object extractor returns a Shared Objects Inventory SO_Inventory composed of metadata (message identifier, date, author identifier), and the lists of tags, URLs, media and mentions present in the message.

For example, the Shared Objects Inventory SO_Inventory can comprise:
Message identifier;
Date;
Author identifier;
Tags;
Urls;
Media;
Mentions of other accounts;

The Shared Object Extractor is preferably dedicated to one or several determined communication platforms N or services. For example, it can handle separately the external URLs internal links. User mentions are detected according to the usage on the platform N: as a hyper-textual link, preceded by a special character ("@" before the username), or differently depending on the communication platform N.

As a natural evolution, new shared objects may be added or removed in the future, depending on their usage, and depending on the platforms analyzed.

Account Data Extraction

The account data AD is collected together with messages circulating on communication platforms N. For example, the account data are collected by storing the user fields associated to each message.

Figure 4:
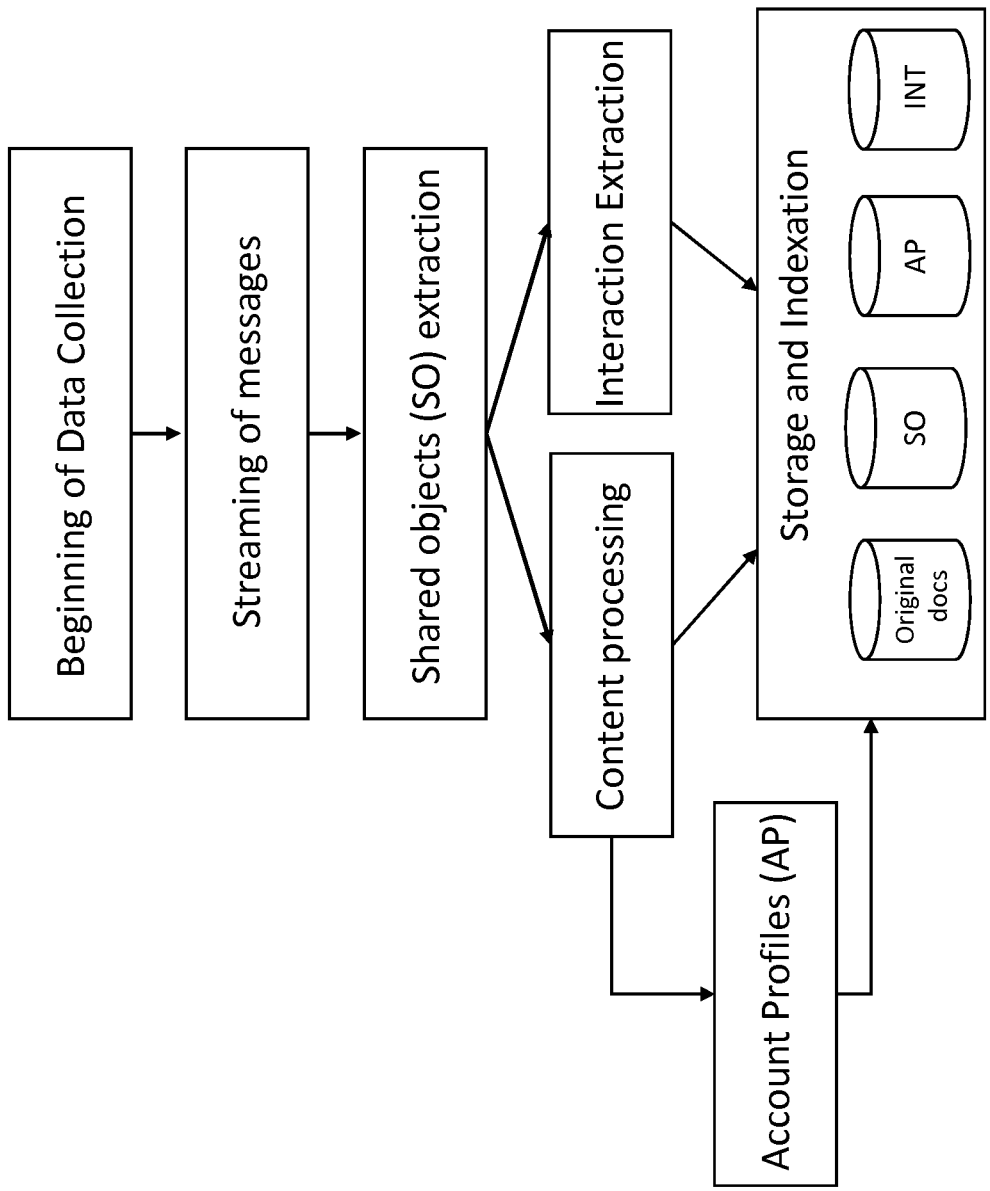
FIG. 4 represents the steps of collecting data and extracting account data, interaction data and shared objects.

The step 20 of extracting interaction data INT, shared objects data SO and account data AD is sketched in FIG. 4.

Advantageously, with the Interaction Extractor and the Shared Object Data extractor being specific to each communication platform, the method 100 according to the invention is adaptable to any platform N and can extract information from messages circulating on different communication platform.

Advantageously, the interaction INT, the shared objects SO and the account data AD extraction are performed in real-time. At a later stage, it will be possible to consider all gathered data from the beginning to the present time or to analyze a determined period of time corresponding to a period of interest.

The computer implemented method 100 according to the invention comprises a step 30 of processing each collected message in order to obtain content metadata CM.

For example, each message text is first pre-processed. This includes language detection, tokenization, part of speech tagging, lemmatization and stop words removal.

Natural Language Processing NLP enables to objectively analyze a message to extract Topic, Sentiment and Emotion from the text.

The first NLP step on each message text is the extraction of topic using existing algorithms. A topic is represented by a label. Implementations include either textual labels (Sport, Politics, USA, technical field . . . ) or numerical labels. In the latter case, the label of the topics represents the mathematical vector of a text, deemed "most descriptive" of a set of texts. The labelling process is the result of unsupervised machine learning such as: Latent Dirichlet Allocation LDA, Latent Semantic indexation LSi or Word2Vec.

NLP also includes the sentiment analysis. Based on the text of a message a sentiment value is computed using linguistic resources and rules, and/or machine learning. The text of a message may also include the order of the words, punctuation, emojis, URLs, other characters, and words which are not in a dictionary. The computed sentiment value states whether the sentiment is "positive", "negative" or "neutral". Neutral texts include no-opinion texts and not predictable texts. Sentiment may be represented either by real values or by a label. Other declination or more precise labels may be used.

A similar module, emotion detection, produces a label based on the perceived emotional impact of the message. Usually, emotion detectors either returns a real vector representing the valence and arousal of the emotion, or returns a label ("joy", "anger", "fear", "contempt", . . . ) from a list of possible labels.

A last part of textual analysis is dedicated to user style measures. The submodule computes various indicators such as length of the text, number of punctuation signs used, number of symbols used, number of capital letters, presence and location of symbols (emojis, tags, etc.), etc. It may also include grammatical indicators (number of verbs, nouns, etc.).

Figure 5:
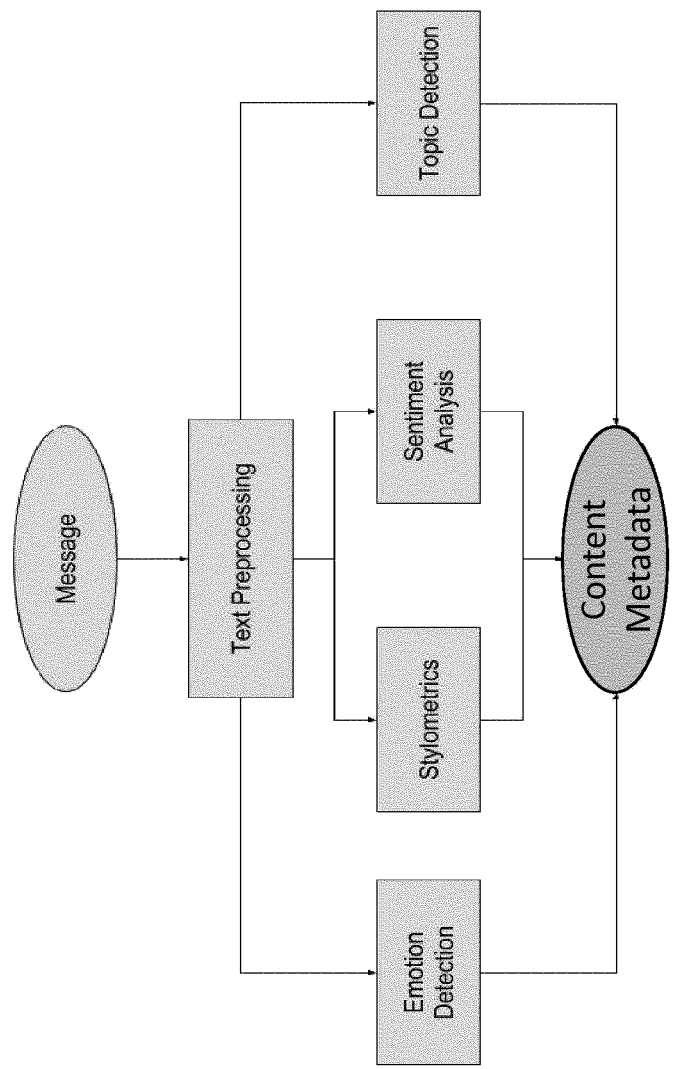
FIG. 5 represents the step of extracting content metadata.

The step 30 of processing each collected message in order to obtain content metadata CM is depicted in FIG. 5.

The method 100 can also comprise a further step of tagging media content at the reception of the message. By using a pre-learnt model such as a machine learning classifier, this step returns a description of what is visible on the picture amongst a list of possible labels ("people", "airplane", "sea", "mountain", "city", "flag", . . . list contains 1000 possible labels).

The label is then added to the list of the shared object types, under the name "media_tag", and exploited as all the other shared object types.

The computer implemented method 100 according to the invention comprises a further step 40 of processing shared objects SO, interaction data INT, account data AD and content metadata CM associated with a same account, for a first collecting period T1 and for each account, in order to obtain an account profile AP of each account.

Figure 6:
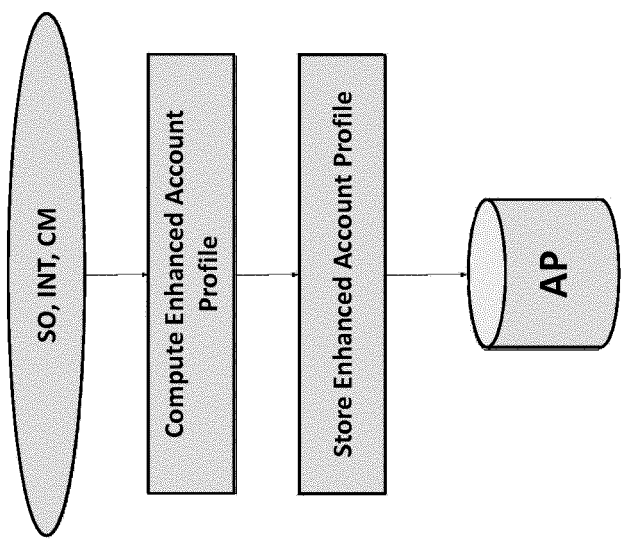
FIG. 6 represents the step of obtaining an account profile of each account in the at least one communication platform.

From the shared objects SO, texts, content metadata CM and interactions data INT, it is possible to compute an enhanced or enriched account profile AP as illustrated in FIG. 6. Basic account profiles are already sent by the communication platform N; here many computed indicators are added. A dedicated database, "user profiles", stores all this user or account information. It enables aspect-based profile clustering. The system enables similarity search for accounts based for example on one of the five aspects: biography, history, media content, text style, time activity and interaction activity. Each of these aspects is a vector representation of a user's behavior and or profile with numerical or textual values. The textual values can be transformed to numerical using previously exposed techniques (LDA, LSi, Word2vec). The numerical values are exploited for similarity searches along one or more aspects (nearest neighbors search) or population-wide profile clustering.

Figure 7:
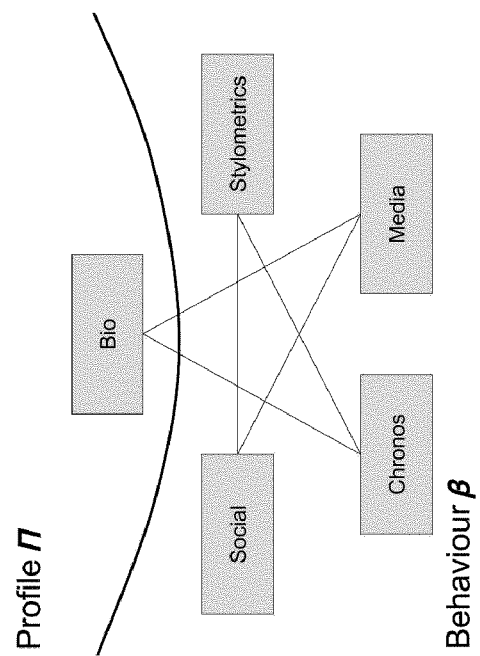
FIG. 7 represents the structure of the account profile obtained thanks to the method of FIG. 1 and in particular thanks to the steps of FIG. 6.

The Enhanced account profile is aspect-based: it is divided in 5 very different aspects to cover the broad range of features in profile and behaviour analysis. An example of these aspects is shown in FIG. 7. The five different aspects of an enhanced account profile according to FIG. 7 comprise the following features:

Bio

User's identity: name, screen-name, identifier, biography, location, creation-date, timezone, language, source (platform of emission or communication platform).

Style $q\_t$, quantity of punctuation;

$l\_t$, message length;

$emoj\_t$ quantity of emojis (Unicode characters);

$emo\_t$ quantity of old-style emojis, for example: :), :-), :D, :(, :/;

$hb\_t$ hashtag in the beginning of the message;

$he\_t$ hashtag in the end of the message;

$hm\_t$ ratio of hashtags/words;

$s\_t$ sentiment (polarity in positive, neutral, negative);

$theta\_t$ topic of the message (a label computed by a topic detector);

Media

For each of the shared object types, we compute the average daily number of this type of shared objects in a message, and the daily total number.

Interaction

For each of the interaction types, we compute the average daily number of this type of interaction in a message, and the daily total number. For example, we also compute the number of original, non-citation posts (originality), and the number of different users mentioned, daily (diversity).

Chronos

We store the histogram of an account activity per hour during T1, which can be chosen equal to a week. We store last week history as well as a mean weekly history on all past data. For example, the mean time between messages $mu\_\{tw\}$ and its standard deviation $sigma\_\{tw\}$ can be computed and stored.

All previous extracted information such as account data AD, interaction data INT, shared object SO, content metadata CM is stored in a database hosted on a set of computers. Each type of information (original documents, metadata, shared objects, user profiles, interactions) may be stored in dedicated subsystems (tables, cores, servers).

The computer implemented method 100 according to the invention further comprises a step 50 of building a shared objects graph Go and an interaction graph Gi. The shared objects graph Go and the interaction graph Gi are built from the shared objects SO, the account data AD and the interaction data INT. The data for the construction of the shared object graph Go and the interaction data graph Gi are collected during a collecting period T2.

Shared objects SO and interaction data INT are gathered to build a graph whose nodes are accounts and edges are interaction or shared objects between two accounts. Edges are labelled with a weight value. More precisely:

Gi, Graph of Interaction

We put a directed edge (or add one to the value) from a first account to a second account if the two accounts interact during the time period of analysis T2. Common values for T2 are one hour or one day.

Threshold mechanisms enable the removal of edges (based on weight or date values; as an example, the removal of a one-time interaction, too weak to mean something in some use cases) or nodes.

This process takes place on a set of computers with shared memory and storage (enabling the processing of bigger-than-memory graphs).

Go, Graph of Shared Objects

For each of the shared object types, we do the following: for each shared object (as an example, one precise URL), we put an edge between every user who emitted the URL. Edge values are then used to threshold the weaker edges. The same time period as for Gi is used.

Alternatively, Go can be built with edges linking an author to the shared objects used. Go would contain both user-nodes and SO-nodes. A distance between users can be easily computed, based on the maximal flow between their nodes.

These two graphs Gi and Go are built and stored every T2 time period. Typical T2 lengths are one hour or one day.

Advantageously, the step 50 of building an interaction graph Gi and a shared object graph Go with an acquisition rate of T2 makes it possible to map and store the evolution of the shared information and of the interactions through the at least one communication platform N.

Advantageously, it is possible to choose the value of the acquisition period T2 based on the kind of change or evolution the analyst wants to observe.

The computer implemented method 100 according to the invention further comprises a step 60 of aggregating shared objects graphs Go and respectively interaction graphs Gi, acquired during a third collecting period T3, to obtain an aggregated shared objects graph Go1 and respectively an aggregated interaction graph Gi1.

The third collecting period T3 can be a multiple of the second collecting time T2.

Advantageously, with each new time step T2, the graph is (slightly) changed as to include new elements (thus, nodes and edges) and to remove ("forget") old ones. This time mechanism enables to keep in ROM the T2-graphs and to perform analysis at T3 scale without re-building the graph each time.

The step 70 of the computer implemented method 100 according to the invention comprises the building a resulting graph G, the resulting graph G being the combination of the aggregated shared objects graph Go1 and of the aggregated interaction graph Gi1.

Figure 8:
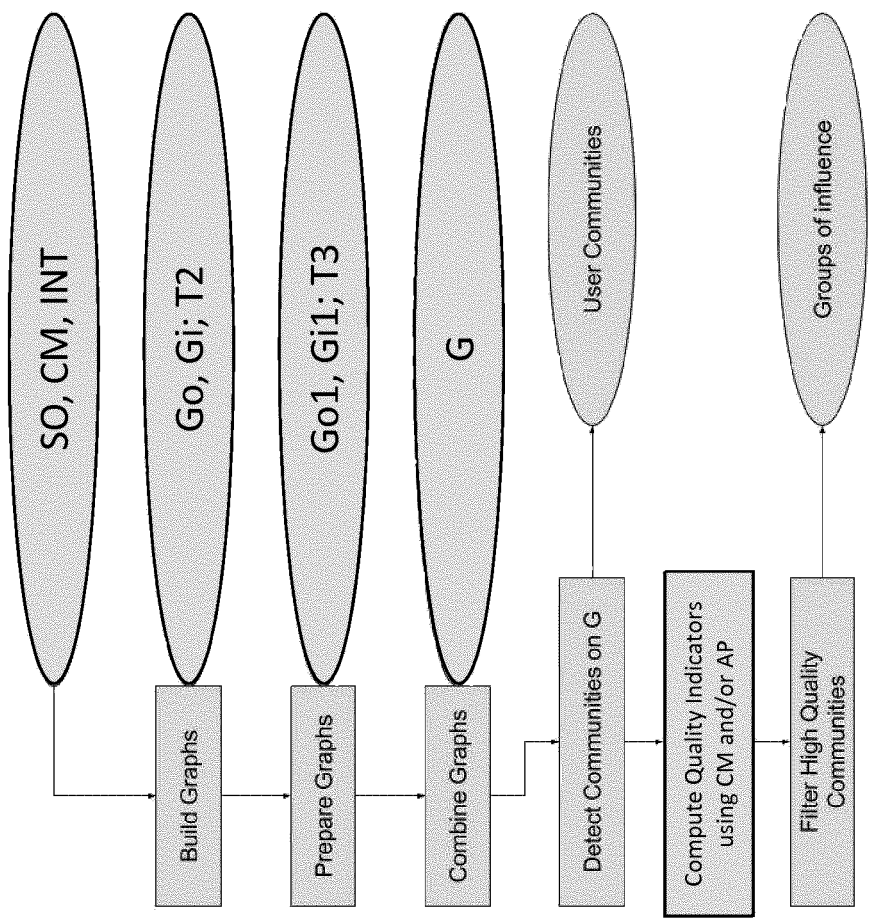
FIG. 8 represents the steps of building an interaction and a shared objects graph, of obtaining a resulting graph and of detecting account communities by analyzing the resulting graph.

The building process of the different graphs is shown in FIG. 8.

Advantageously, the resulting graph gives a comprehensive representation of the interactions and of the objects shared by accounts on several communication platforms during the collecting time T3.

The resulting graph G is obtained as the intersection of the graphs Go1 and Gi1. By intersection, we mean that nodes and edges need to be present in both; the smaller values of edge weight are retained. Advantageously, the resulting graph G represents relationship between users where there are, at the same time, interaction and a common interest due to the shared objects exchanged.

The method 100 according to the invention further comprises a step 80 of applying a community detection method to the resulting graph G to obtain a set of communities C of accounts $A_1, A_2 \ldots A_n$.

Advantageously, this method returns a list of sets of nodes, each set representing a "community". A node may belong to zero, one or more communities. Each (node, community) couple is associated with a "belonging coefficient" representing the importance of the community for a node (as an example, a node may belong 50/50 to two groups).

An algorithm called "Louvain" can be used to perform community detection.

Alternatively, other kind of algorithms can be used for implementing the community detection steps. Some examples are InfoMap, Walktrap and FastGreedy. Well-known algorithms for covers (one node may belong to more than one community) are CONGO, COPRA and SLPA.

The step 90 of the method 100 according to the present invention comprises computing quality indicators QI of the set of communities C to obtain at least one score for each community according to at least one quality indicator method taking into account content metadata CM and/or account profile AP, said score enabling the selection of at least a relevant community.

The previously obtained communities endure a statistical analysis: Quality Indicators are used to describe them, including topological indicators computed on the graph:
modularity of a group in a graph,
internal density,
size: number of members of the group,
conductance,
and content-based indicators, computed using also the original documents and the previously computed data:
number of messages exchanged (emitted and directed to members of the group),
list of the main topics of the messages emitted by members of the group,
list of the most emitted shared objects,
"xi" score, "rho" score, "theta f.igf" scores, which produce indicators of the importance of a community on a topic, and of the importance of a topic for a community. For the meaning of these parameters see for example "Measures for topical cohesion of user communities on Twitter" by G. Gadek et al. published on Proceedings of the International Conference on Web Intelligence, 2017.

This analysis is associated with a visualisation using a dashboard on an electronic system, displaying the community as a graph, and the other indicators. It includes pie charts, bar charts, graphs and time series.

The method 100 according to the invention can comprise a further step of filtering the set C of communities.

For example, a filter of the communities is performed based on the quality indicators, to present the "high quality" groups to the analysts. These groups are more cohesive (more links within) and more topically focused (its members talk about the same topics and shared objects) than other groups.

The method 100 according to the invention can comprise a further step of a step of role detection RD performed on Gi1 or G within the determined communities C. At group-scale, user aspect-based vector representation is exploited through state-of-the-art algorithms (possible implementations: GLRD, RoIX) to compute and detect roles of users inside a group. Each user receives (role, weight) couples for each possible role (usually, 3 to 7 possible roles). Roles are typical vectors in the same space as the user aspect-based vector representations. It may include one or more of the five aspects previously described, based on the choices of the analyst.

This role attribution enables, for example, a visualisation step for the analyst to compare a user position in the relational graph, and his activity-based roles on a same picture. The result can also show the repartition of roles amongst the detected communities. It can, for example, answer two levels of questions:

1) Who are the members of the group? (Most active/less active?)

2) How to summarise a group? (Is the group composed of many active members? Who are the most important members?)

Figure 2:
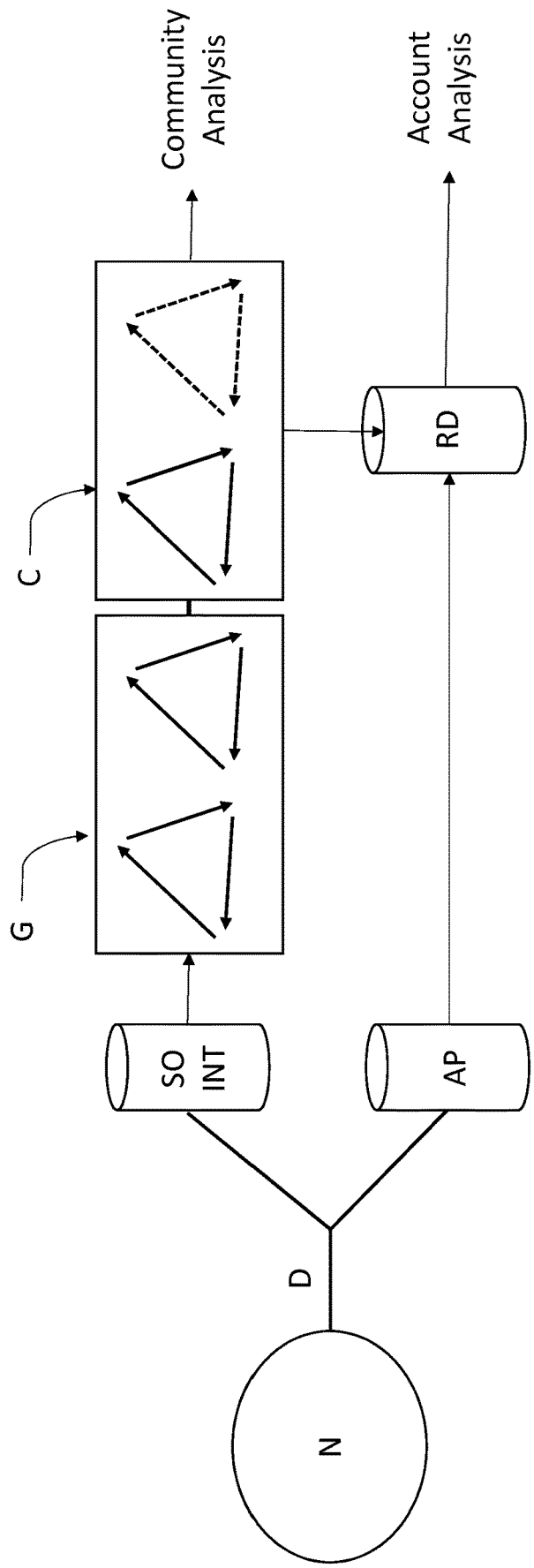

FIG. 2 represents an overview of the working principle of the computer implemented method 100 for detecting a set of relevant communities of accounts.

First, media messages or data on a communication platform N are collected. These messages are stored in a database under different tables, namely but not limited to the interactions between accounts INT and the shared objects SO (items such as hashtags, URLs, media, files, reports) emitted by each account. Both interactions INT and shared objects SO are part of the creation of a relational or resulting graph G between accounts, where nodes are accounts and edges represent either an interaction INT or a shared object SO such a common interest in a topic, URL, media, etc. Edges may be time-valued, labelled, weighted according to the importance of the link between two users. This graph is processed by a community detection algorithm. In the community detection algorithm an overlap may be allowed: a user may belong to 0, 1 or more groups. The obtained communities C are then analyzed through a statistical process taking on account size, density, modularity, information about the main characteristics of its users/members, semantic cohesion of the messages exchanged between the users.

The same flow of data is processed to extract account-oriented information AP to feed a second database for account profiling. Profile could include biographic and behavioral information such as temporal behavior, information about the emission of media files, style of writing . . . .

Finally, in each detected group or community C, the profiles of the accounts AP are used to proceed to the Role Detection RD analysis. The role detection RD analysis takes into account parameters such as importance of a member, media, time activity of each member to extract clusters of behaviors, influence ranking and visualization.

Figure 3:
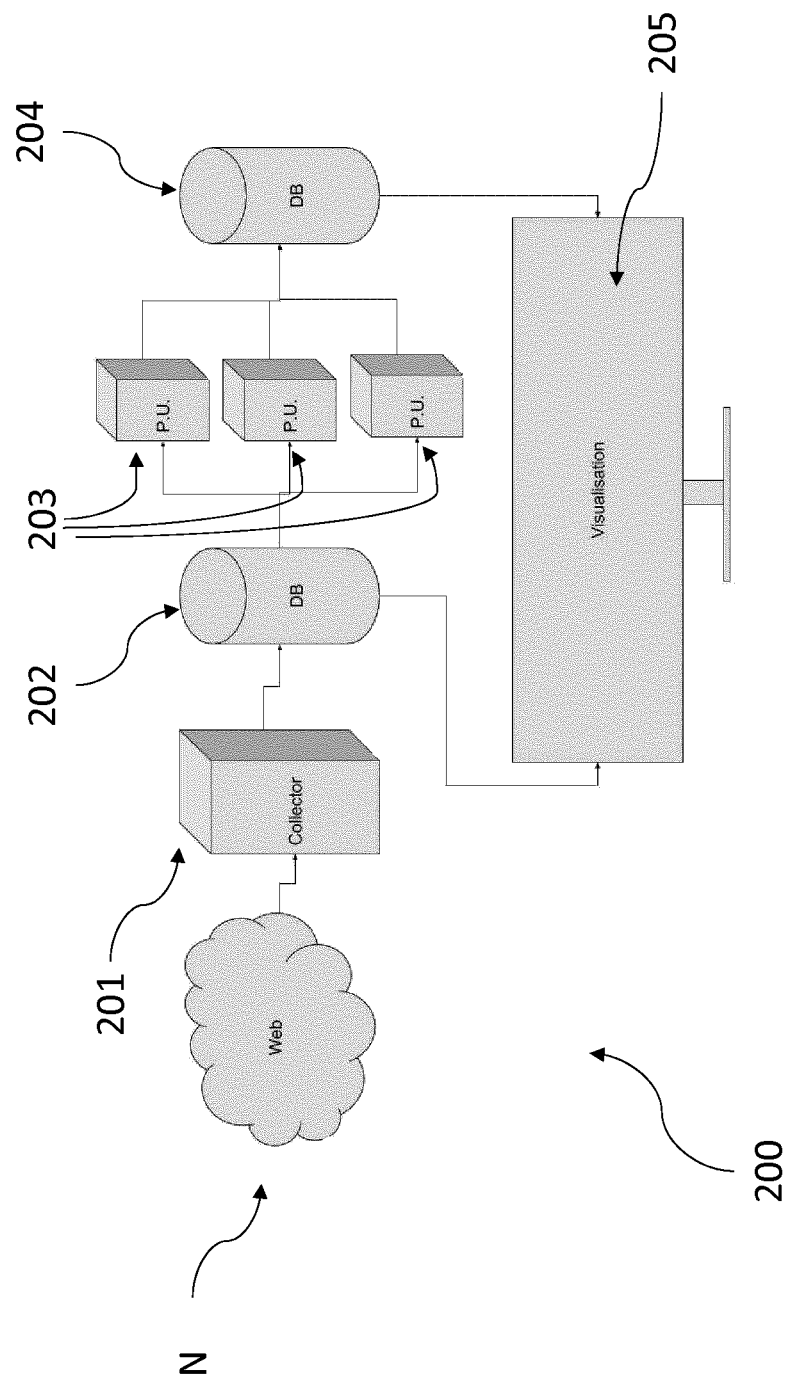
FIG. 3 represents the system for implementing the method according to the invention.

FIG. 3 shows a system 200 for automatically implementing the computer based method 100 according to the invention.

The system 200 according to the invention comprises:
At least a collecting unit 201 for collecting data D from the at least one communication platform N;
A first memory unit 202;
At least one processing unit 203 for processing collected data D;
A second memory unit 204;
A Visualization unit 205.

FIG. 3 shows that the system 200 collects data D from at least a communication platform N thanks to at least a collecting unit 201.

A first memory 202 stores the collected data D. Several processing units 203 process the stored data in order to determine interaction data INT, shared object data SO, account data AD. Moreover, the processing units 203 builds and process the different graphs such as shared objects graph Go, aggregated shared object graph Go1, interaction graph G1, aggregated interaction graph Gi, resulting graph G. The processing units 203 perform also the analysis of the resulting graph G, by applying the detection community algorithms and by computing quality indicators for the detected set of communities C.

The processing units 203 also perform the Role detection analysis within each detected community.

More generally, the processing units 204 are adapted to perform all the processing steps comprised in the computer implemented method 100 according to the invention.

All the outputs from the processing units 203 are stored in a second memory unit 204.

A visualization unit 205 visualizes the processing units 203 outputs.

Each collecting units 201 can be an algorithm or a piece of code specific to a given communication platform N.

The different elements of the system 200 can be separated or grouped in a unique computing system.

The invention claimed is:

1. A computer implemented method for detecting a set of relevant communities of accounts, said accounts being connected by at least one communication platform, said method comprising:
collecting data from a stream of messages circulating on at least one communication platform, the collecting of the data being carried out by an algorithm executed by a processing unit of a computer system, said collected data comprising message content and account information and being stored in a first memory of the computer system;
extracting, from each collected message, interaction data, account data and shared objects, the extracting being carried out automatically with a dedicated algorithm executed by the computer system, said shared objects being shared among the accounts through at least one communication platform;
processing, by the computer system, each collected message in order to obtain content metadata;
processing, by the computer system, shared objects, interaction data, account data and content metadata associated with a same account, said processed shared objects, interaction data, account data and content metadata being collected during a first collecting period and for each account, in order to create an enhanced account profile of each account, the enhanced account profile being different from a basic account profile of said account sent by the communication platform;
from the shared objects, the account data and the interaction data building, by the computer system, shared objects graphs and interaction graphs, said shared objects, account data and interaction data for graph building being collected during a second collecting period, said shared objects graphs comprising nodes formed by accounts and connected by edges formed by a quantity of shared objects emitted by two accounts associated with two connected nodes in the shared objects graphs, and said interaction graphs comprising nodes formed by the accounts and connected by edges representing interactions between two connected nodes in the interaction graph;
aggregating, by the computer system, the shared objects graphs and respectively interaction graphs, during a third collecting period, to obtain an aggregated shared objects graph and respectively an aggregated interaction graph,
building, by the computer system, a resulting graph, the resulting graph being the combination of the aggregated shared objects graph and of the aggregated interaction graph, the resulting graph providing a representation of interactions and objects shared by the accounts;

applying, by the computer system, a community detection method to the resulting graph to obtain a set of communities of accounts;

computing, by the computer system, quality indicators of the set of communities to obtain at least one score for each community according to at least one quality indicator method taking into account content metadata and/or account profiles, displaying, on a visualization unit of the computer system, the at least one score for each community, said score enabling an identification and a selection of at least a relevant community of one or more accounts among all accounts of the set of communities of accounts.

2. The method according to claim 1, wherein the extracting further comprises setting a data structure containing shared objects extracted from the collected data.

3. The method according to claim 2, wherein the data structure comprises at least one of the following categories or any combination thereof:
Message identifier;
Date;
Accounts identifier;
Tags;
URLs;
Media contents;
Mentions or links to other accounts.

4. The method according to claim 3, wherein the data structure comprises text content and/or media content and/or user information.

5. The method according to claim 1, wherein the processing of shared objects comprises a step of inserting in the data structure content metadata.

6. The method according to claim 1, wherein the processing of each collected messages comprises a media content processing step.

7. The method according to claim 1, wherein said calculated account profiles are stored in a database of account profiles.

8. The method according to claim 1, wherein the shared object graph and the aggregated shared object graph are stored in a dedicated database.

9. The method according to claim 1, wherein the interaction graph and the aggregated interaction graph are stored in a dedicated database.

10. The method according to claim 1, wherein the resulting graph is an intersection graph comprising the nodes and the edges present in both the aggregated shared object graph and the aggregated interaction graph.

11. The method according to claim 1 further comprising performing role detection on the aggregated interaction graph or the resulting graph within the determined communities.

12. A computer system to automatically implement the computer implemented method according to claim 1, said computer system comprising:
a collecting unit to collect data from a stream of messages circulating on at least one communication platform;
the first memory unit to store the collected data;
the processing unit to process the collected data and to realize the step comprised in the computer implemented method;
a second memory unit to store the output of the different steps of the method, and
the visualization unit for accessing the content of the first and second memory units.

13. The system according to claim 12, comprising several collecting units, each unit being specific to a communication platform.

* * * * *